(No Model.) 2 Sheets—Sheet 1.
H. J. PATTON & J. C. WISELEY.
APPARATUS FOR MAKING CANDY.
No. 389,406. Patented Sept. 11, 1888.
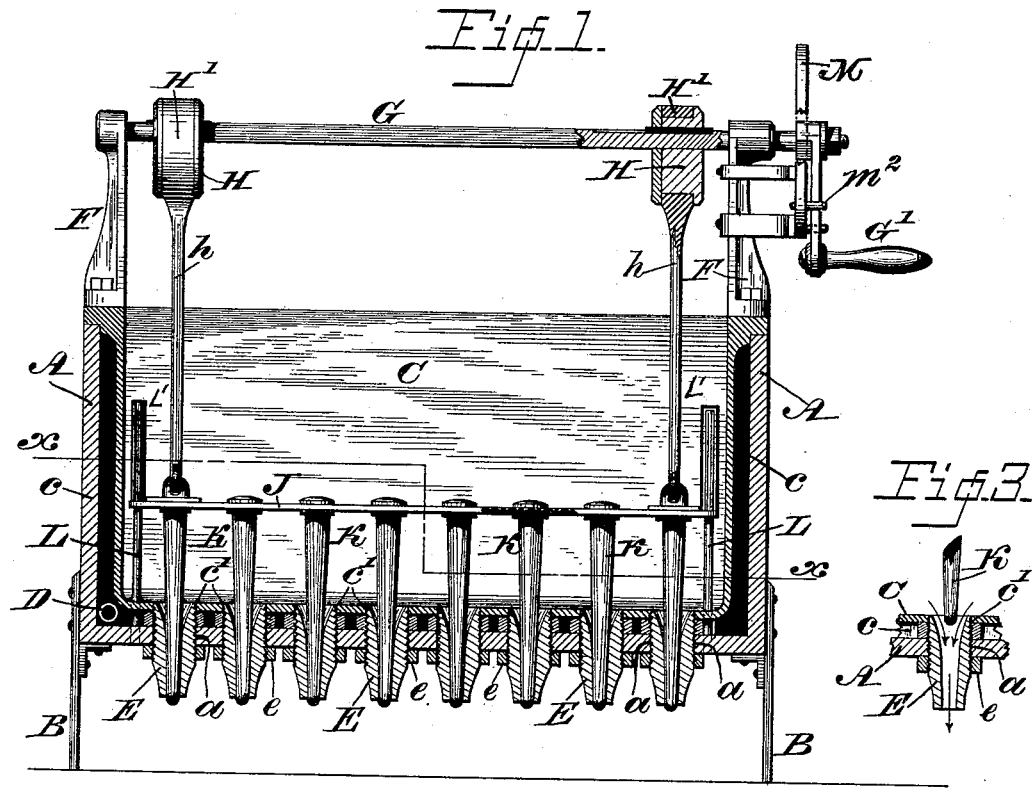
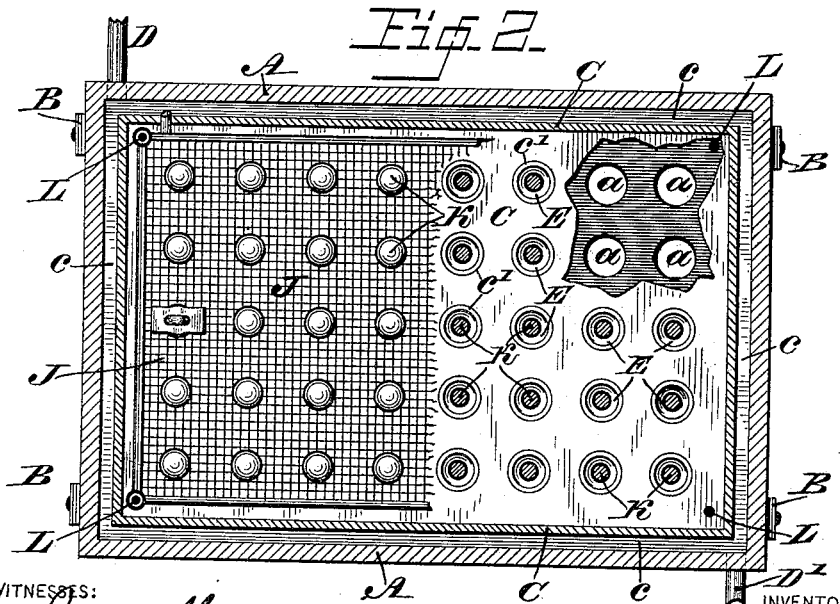
WITNESSES:
INVENTORS:
Harry J. Patton
John C. Wiseley
BY Diedersheim & Kintner
ATTORNEYS.

(No Model.) 2 Sheets—Sheet 2.
H. J. PATTON & J. C. WISELEY.
APPARATUS FOR MAKING CANDY.
No. 389,406. Patented Sept. 11, 1888.
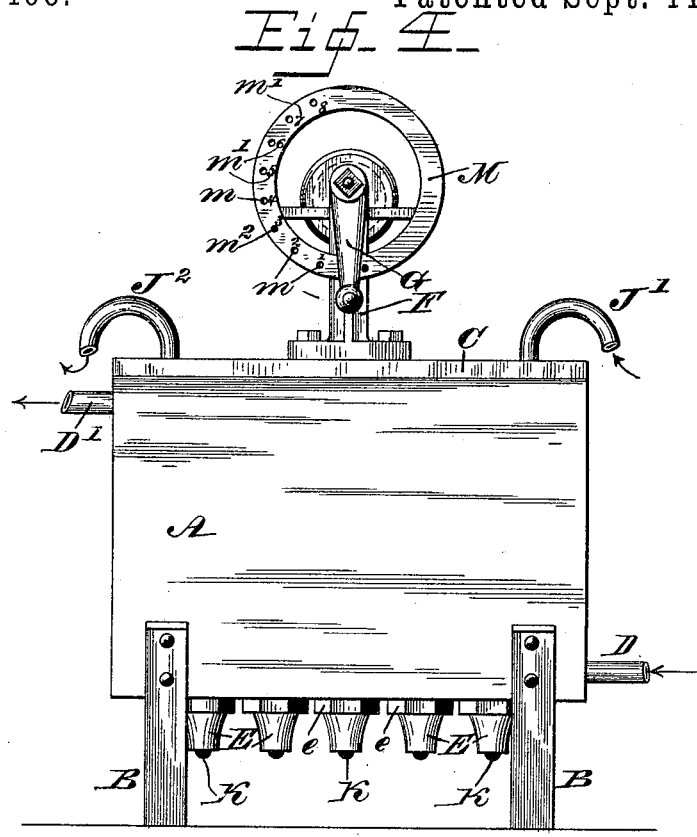
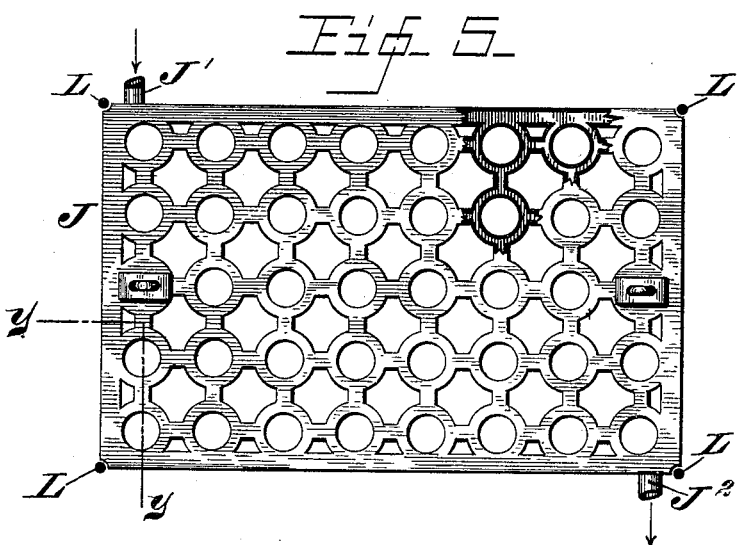
WITNESSES: INVENTORS:

United States Patent Office.

HARRY J. PATTON AND JOHN C. WISELEY, OF PHILADELPHIA, PENNSYLVANIA.

APPARATUS FOR MAKING CANDY.

SPECIFICATION forming part of Letters Patent No. 389,406, dated September 11, 1888.

Application filed April 7, 1888. Serial No. 269,906. (No model.)

*To all whom it may concern:*

Be it known that we, HARRY J. PATTON and JOHN C. WISELEY, citizens of the United States, residing in the city and county of Philadelphia, State of Pennsylvania, have invented a new and useful Improvement in Apparatus for Making Candy, which improvement is fully set forth in the following specification and accompanying drawings.

Our invention relates to improvements in an apparatus for making candy, and has especial reference to an apparatus for making drop-candy.

The primary object of the invention is to produce an apparatus which will make candy of any desired size or shape perfectly with ease and rapidity.

A further object is to provide an apparatus of very simple, durable, and cheap construction which will be thoroughly efficient for the purpose intended.

To attain the desired objects, the invention consists, first, in constructing the device of an inner and an outer vessel, with an intervening chamber having steam inlet and outlet pipes, tubes in the bottoms of said vessels, a rotary shaft with handle, and eccentrically-connected plungers adapted to operate in said tubes, and a regulating device for said handle; second, in constructing the device of an inner and an outer vessel provided with tubes inserted in screw-threaded holes in the bottoms thereof, said tubes having their upper interior portions flaring, a rotary shaft journaled in standards secured to the vessels, and having a handle for rotating the same, and plungers eccentrically secured to said shaft and operating in said tubes; third, in providing the device with a hollow open head or frame with openings in the upper and lower walls, said frame having steam inlet and outlet pipes and adapted to carry the plungers; and, further, in the combination and arrangement of parts, as herein set forth and claimed.

Figure 1 represents a vertical longitudinal sectional view of a candy apparatus embodying our invention. Fig. 2 represents a horizontal sectional view thereof on line $x\ x$, Fig. 1, parts being broken away. Fig. 3 represents a detail sectional view of one of the tubes. Fig. 4 represents an end elevation of the apparatus. Fig. 5 represents a plan view of a modified form of the head or frame carrying the plungers. Fig. 6 represents a sectional view of a part of the open frame or head on line $y\ y$, Fig. 5.

Similar letters of reference indicate corresponding parts in the several figures.

Referring to the drawings, A designates the outer case or receptacle, supported on legs B, and having its bottom provided with screw-threaded openings $a$.

C designates the inner vessel arranged in the outer one to provide a space or jacket, $c$, and provided with screw-threaded openings $c'$ in its bottom in line with the openings $a$.

D designates a pipe for supplying steam or heat to said space or jacket $c$, and D' designates a pipe for carrying off the exhaust-steam. From this construction it is evident that live steam is always circulating in the space between the inner and outer vessels, and thus retains the candy material in a heated condition at all times, the purpose of which is well known.

E designates tubes screwed in the aligned openings of the outer and inner vessels. In this case the tubes are shown as circular in cross-section; but, as is evident, they may be formed in any desired shape to suit the purpose.

F designates standards or posts rising from the upper edge of the vessel, and having the shaft G journaled in the upper ends thereof, this shaft being provided with a crank or handle, G'.

H designates eccentrics keyed or secured on the shaft G, and H' designates bands embracing said eccentrics and carrying the rods $h$. To the lower ends of the rods $h$ is loosely connected the frame or head J, which frame, as shown in Figs. 1 and 2, is formed of a hollow rim or border and a wire body. In Figs. 5 and 6 is shown a more preferable form of the head, the same being constructed of an open frame-work or hollow castings to receive the plungers and openings to allow the passage of the material. This open frame is supplied with steam to keep it in a heated state and prevent the material adhering to it by means of a pipe, J', and a pipe, J², is employed for carrying off the exhaust-steam. The said frame or head carries plungers K, which are heated by means of the steam supplied to the frame or head and adapted to work in the tubes E to close and open the same at regular intervals. To guide the frame or head in its vertical movement, we provide vertical rods L, having their lower ends secured to the outer vessel, A, and which pass through the inner vessel and through openings in the head J, and work in the sockets L', secured to the upper face of said head.

To prevent the tubes E from working loose or dropping out in consequence of the action of the plungers therein, we screw them in place by means of nuts e.

M designates a circular band secured to the standard adjacent to the handle provided with openings m, having numbers m' arranged near said openings, providing a scale, and in any one of said openings is adapted to be placed a pin or stud, m², the purpose of which is to limit the movement of the handle by contact therewith, and consequently that of the plungers, to make the material fall in drops of any desired size, as will be readily understood.

The operation is as follows: The pin or stud is placed in the desired opening in the circular band to regulate the size of drop, the material is poured upon the hollow open frame, passing therethrough to the inner vessel, and by turning the crank the plungers are elevated and lowered, causing the candy to drop at regular intervals and in the exact size into the molds, where it is formed into the desired shape, as is evident.

In order to facilitate the passage of the candy material through the tubes, they are made flaring at their upper ends, which permits the material to flow through said tubes with ease and rapidity.

Having thus described our invention, what we claim as new, and desire to secure by Letters Patent, is—

1. An apparatus for making candy, consisting of an inner and an outer vessel, with a space or chamber between the same, a steam inlet and an outlet pipe for said chamber, tubes connected to the bottoms of said vessels, plungers connected eccentrically to a rotary shaft and having their lower ends in said tubes, a handle to said shaft, and a band secured to the frame of the device and provided with openings adapted to receive a pin, whereby the play of the handle is regulated, said parts being combined substantially as described.

2. In an apparatus for making candy, an outer and an inner vessel, each having screw-threaded holes in the bottom thereof, tubes exteriorly screw-threaded and having their upper interior portion flaring, standards secured to the top of the casing, a shaft journaled in said standards, eccentrics on said shaft, a vertically-moving head located within the inner vessel, and rods connecting said eccentrics therewith, and plungers secured to said head and working in said tubes, said parts being combined substantially as described.

3. In an apparatus for making candy, the combination of the vessels having the aligned screw-threaded openings in their bottoms, with tubes screwed into said openings, and steam-pipes leading into and from said space between said vessels, a hollow open or reticulated head or frame carrying plungers for opening and closing said tubes, and provided with inlet and outlet steam-pipes, and mechanism for elevating and lowering said frame or head, substantially as and for the purpose described.

4. In an apparatus for making candy, the combination of the two vessels, one within the other and having a space between them, with the steam-pipes leading to and from said space, tubes leading from the bottoms of said vessels, standards secured to the top of the casing, a hollow open head with steam inlet and outlet pipes, a rotary shaft on said standards, and eccentrics, yokes, and rods connecting said rotary shaft to said head, sockets secured to the upper side of said head, plungers secured to said head and working in said tubes, and vertical guides secured to said outer vessel, and having their upper ends working in the sockets on said head, substantially as described.

5. In an apparatus for making candy, the herein-described head or frame, consisting of a hollow casting provided with openings in its upper and lower walls and with steam inlet and outlet openings on its sides, substantially as and for the purpose described.

6. In an apparatus for making candy, the combination, with the crank or handle, of the band provided with a series of openings, and a pin adapted to be placed in any one of said openings, against which said crank or handle is adapted to strike, substantially as and for the purpose described.

HARRY J. PATTON.
JOHN C. WISELEY.

Witnesses:
JOHN A. WIEDERSHEIM,
WM. N. MOORE.